United States Patent [19]

Floyd et al.

[11] Patent Number: 4,807,104
[45] Date of Patent: Feb. 21, 1989

[54] VOLTAGE MULTIPLYING AND INVERTING CHARGE PUMP

[75] Inventors: Michael D. Floyd, Austin; Jeffrey D. Stump, Elgin, both of Tex.

[73] Assignee: Motorola, Inc., Schaumburg, Ill.

[21] Appl. No.: 182,010

[22] Filed: Apr. 15, 1988

[51] Int. Cl.[4] ............................................. H02M 3/18
[52] U.S. Cl. ...................................... 363/59; 307/110
[58] Field of Search .................... 307/110; 363/59, 60, 363/63

[56] References Cited

U.S. PATENT DOCUMENTS

| | | | |
|---|---|---|---|
| 4,047,091 | 9/1977 | Hutchines et al. | 363/59 |
| 4,050,004 | 9/1977 | Greatbatch | 363/59 |
| 4,061,929 | 12/1977 | Asano | 367/246 |
| 4,186,436 | 1/1980 | Ishiwatari | 363/60 |
| 4,404,624 | 9/1983 | Yamazaki | 363/59 |
| 4,485,433 | 11/1984 | Topich | 307/110 |
| 4,616,303 | 10/1986 | Mauthe | 363/60 |
| 4,621,315 | 11/1986 | Vaughn et al. | 363/60 |
| 4,636,930 | 1/1987 | Bingham et al. | 363/60 |
| 4,679,134 | 7/1987 | Bingham et al. | 363/61 |
| 4,734,599 | 3/1988 | Bohac, Jr. | 307/497 |
| 4,777,577 | 10/1988 | Bingham et al. | 363/60 |

FOREIGN PATENT DOCUMENTS 219345 2/1985 German Democratic Rep. .

OTHER PUBLICATIONS

"At Last, It's Easy to Design RS-232-C Modems", Electronics magazine, Jul. 24, 1986, p. 89.

*Primary Examiner*—Patrick R. Salce
*Assistant Examiner*—Jeffrey Sterrett
*Attorney, Agent, or Firm*—Robert L. King

[57] ABSTRACT

A charge pump circuit and associated method is provided for outputting either a positive or a negative output voltage, or both, which each may have a predetermined magnitude which is an integer multiple of the magnitude of a power supply voltage used to power the circuit. In one form, a first capacitor is charged to the power supply voltage. The first capacitor is coupled to the power supply voltage to develop a double voltage transfer supply with the supply voltage. Second and third capacitors are charged by the double voltage transfer supply. The second capacitor is used to store the charge from the first capacitor for a continuous output voltage having a magnitude which is twice the magnitude of the power supply. The third capacitor may be reconfigured to generate a negative transfer voltage. The negative transfer voltage is used to charge a fourth capacitor which provides a negative output voltage with twice the magnitude of the power supply voltage.

5 Claims, 2 Drawing Sheets

VOLTAGE MULTIPLYING AND INVERTING CHARGE PUMP

FIELD OF THE INVENTION

This invention relates generally to analog circuits requiring operating voltages greater than available power supply voltages, and more particularly, to charge pump circuits.

BACKGROUND OF THE INVENTION

A voltage doubling and voltage inverting circuit which is capable of providing positive and negative output voltages which exceed the circuit's power supply voltage by a factor of two is commonly required. An example of of a known charge pump circuit which performs this function is taught in U.S. Pat. Nos. 4,636,930 and 4,679,134, both entitled "Integrated Dual Charge Pump Power Supply and RS-232 Transmitter/Receiver". Typical requirements of charge pump circuits include a requirement to avoid latch-up and assure correct start-up. Previous charge pumps have obtained voltages exceeding a power supply voltage by using a transfer capacitor which transfers charge onto a reservoir capacitor previously charged by the power supply. Such circuits typically have a large negative supply source resistance due to the addition of the positive supply source resistance with the resistance of the circuitry for the negative supply. The addition of the resistance of the positive and negative supply circuit portions results in power consumption which may be critical for low power supply voltages.

BRIEF DESCRIPTION OF THE INVENTION

Accordingly, it is an object of the present invention to provide an improved voltage doubling and inverting charge pump and method.

It is another object of the present invention to provide an improved voltage doubling and inverting charge pump which minimizes power consumption.

In carrying out these and other objects of the invention, there is provided, in one form, a method and circuit for providing a positive and a negative output voltage in which each output voltage has a magnitude subsequently equal to a predetermined integer multiple, such as two, of the magnitude of a power supply voltage of a power supply for powering the circuit. A first capacitor of the circuit is charged to the power supply voltage. A negatively charged electrode of the first capacitor is coupled to a positive terminal of the power supply thereby translating a positively charged electrode of the first capacitor to a voltage which is twice the power supply voltage. The doubled power supply voltage is selectively used to charge both a second capacitor which outputs a positive doubled power supply voltage and a third capacitor which stores a negative doubled power supply voltage. Charge of the third capacitor is charge shared onto a fourth capacitor which outputs a continuous negative voltage which is twice the power supply voltage. Switches are provided for implementing the above mentioned circuit couplings.

These and other objects, features and advantages will be more clearly understood from the following detailed description taken in conjunction with the accompanying drawings.

DETAILED DESCRIPTION OF THE INVENTION

Figure 1:
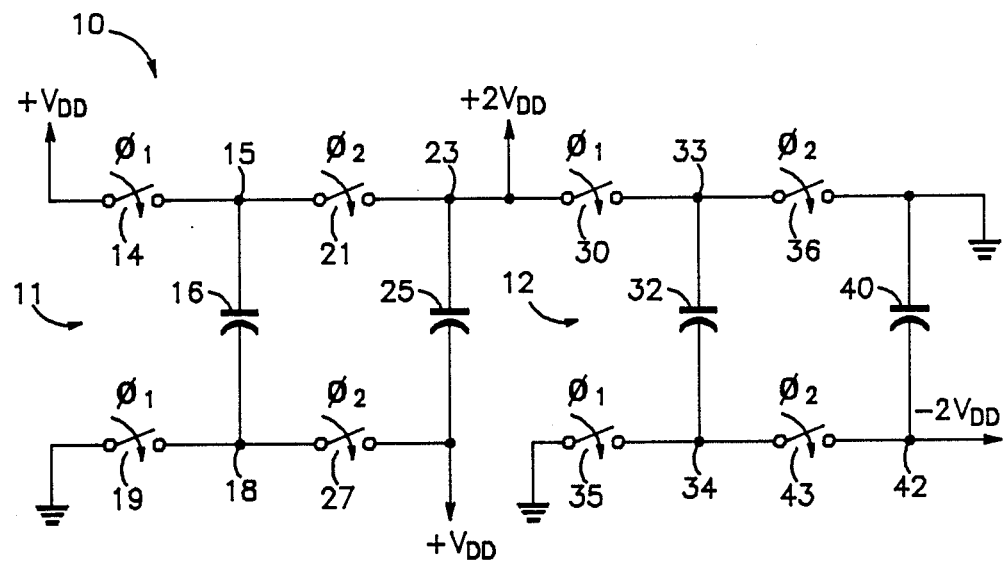
FIG. 1 illustrates in schematic form a known charge pump circuit.

Shown in FIG. 1 is a known charge pump circuit 10 generally comprising a positive voltage portion 11 and a negative voltage portion 12. Positive voltage portion 11 comprises a switch 14 having a first terminal connected to a positive supply voltage labeled $V_{DD}$. A second terminal of switch 14 is connected to a first electrode of a transfer capacitor 16 at a node 15. A second terminal of capacitor 16 is connected to a first terminal of a switch 19 at a node 18. A second terminal of switch 19 is connected to a reference ground terminal. A first terminal of a switch 21 is connected to node 15 and a second terminal of switch 21 is connected to a first electrode of a reservoir capacitor 25 at an output node 23 for providing a positive doubled output voltage, $+2V_{DD}$. A second electrode of capacitor 25 is connected to positive supply voltage $V_{DD}$. A first terminal of a switch 27 is connected to positive supply voltage $V_{DD}$, and a second terminal of switch 27 is connected to node 18.

Negative voltage portion 12 comprises a switch 30 having a first terminal connected to node 23 and a second terminal connected to a first electrode of a transfer capacitor 32 at a node 33. A first terminal of a switch 35 is connected to the second electrode of capacitor 32 at a node 34. A second terminal of switch 35 is connected to the reference ground terminal. A first terminal of a switch 36 is connected to node 33, and a second terminal of switch 36 is connected to both the reference ground terminal and a first electrode of a reservoir capacitor 40. A second electrode of capacitor 40 is connected provides a negative doubled output voltage, $-2V_{DD}$, at an output node 42. A first terminal of a switch 43 is connected to output node 42, and a second terminal of switch 43 is connected to the second electrode of capacitor 32 at node 34.

Switches 14, 19, 21, 27, 30, 35, 36 and 43 each have a control terminal for receiving either a first control signal $\phi_1$ or a second control signal $\phi_2$. Each of switches 14, 19, 30 and 35 has a control electrode connected to control signal $\phi_1$ and switches 21, 27, 36 and 43 each have a control electrode connected to control signal $\phi_2$. Control signals $\phi_1$ and $\phi_2$ are nonoverlapping clock signals. In one form, the switches may be conventionally implemented so that a control signal makes the switch conductive when the control signal has a logic high or active state.

In operation, charge pump 10 functions to provide both a positive output voltage and a negative output voltage in which each output voltage has a magnitude which is substantially double the magnitude of the power supply voltage. During a first circuit operation portion, control signal $\phi_1$ makes switches 14, 19, 30 and 35 conductive and control signal $\phi_2$ makes switches 21, 27, 36 and 43 nonconductive. In this portion of operation, capacitor 16 charges to a voltage potential of $V_{DD}$ with respect to the ground reference. Capacitor 32 is charged by voltage $V_{DD}$ in series with the voltage across capacitor 25 to a potential of $2V_{DD}$ with respect to the ground reference voltage. After capacitors 16 and 32 are provided with sufficient time to charge to the respective values, control signal $\phi_1$ transitions to a logic low level. Control signal $\phi_2$ then transitions to a logic high level during a second portion of operation. At this point in time, switches 14, 19, 30 and 35 are nonconductive, and switches 21, 27, 36 and 43 are conductive. The two portions of circuit operation are repeated successively at a predetermined operation frequency.

With respect to positive voltage portion 11, a charge proportional to the supply voltage $V_{DD}$ is transferred onto capacitor 25 from capacitor 16 where a charge proportional to supply voltage $V_{DD}$ is already present by virtue of the connection of capacitor 25 to supply voltage $V_{DD}$. The transferred charge adds to the previously stored charge on capacitor 25 and provides a voltage substantially equal to $+2V_{DD}$ at node 23 with respect to the reference ground. Capacitor 16 thus functions as a charge transfer capacitor and capacitor 25 functions as a charge reservoir capacitor.

With respect to negative voltage portion 12, a charge proportional to $+2V_{DD}$ is stored onto capacitor 32 during the first portion of circuit operation assuming steady state operation. During the second portion of circuit operation, the stored charge on capacitor 32 is transferred to capacitor 40. However, due to the circuit configuration of capacitor 40 wherein the first electrode of capacitor 40 is connected to the ground reference, the charge is translated or shifted with respect to ground. Therefore, the voltage which appears at the second electrode of capacitor 40 is substantially $(-2V_{DD})$ with respect to the ground reference. Capacitor 32 thus may be referred to as a charge transfer capacitor and capacitor 40 may be referred to as a charge reservoir capacitor.

In the illustrated form, a current which is proportional to the double power supply voltage must flow in charge pump 10 thru both switch 21 and capacitor 25 to provide negative voltage portion 12 with charge for capacitor 32. Capacitor 25 is discharged every clock cycle to provide the current to negative voltage portion 12 required to provide the doubled negative output voltage. Power losses associated with switch 21 and capacitor 25 degrade the performance of charge pump 10 and result in a degraded, reduced valued power supply output voltage.

Figure 2:
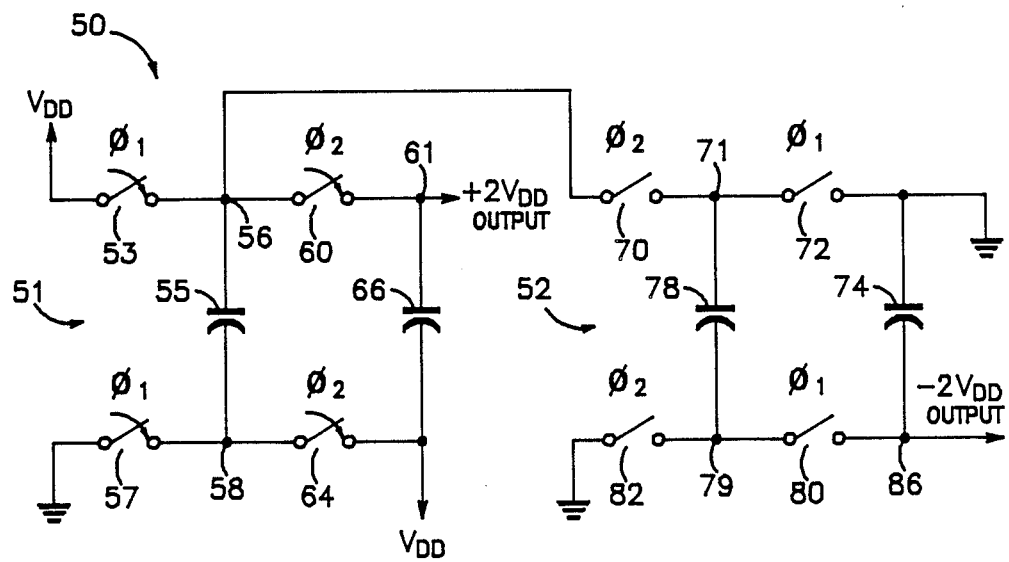
FIG. 2 illustrates in schematic form a charge pump circuit in accordance with the present invention.

Shown in FIG. 2 is a voltage doubling and inverting charge pump circuit 50 generally comprising a positive voltage portion 51 and a negative voltage portion 52. It should be well understood that the present invention may be implemented with any type of electronic process including MOS and bipolar and other processes.

Positive voltage portion 51 comprises a switch 53 having a first terminal connected to a positive portion supply voltage terminal for receiving a positive power supply voltage, say $V_{DD}$. A second terminal of switch 53 is connected to a first electrode of a transfer capacitor 55 at a node 56. A second electrode of capacitor 55 is connected to a first terminal of a switch 57 at a node 58. A second terminal of switch 57 is connected to a ground reference terminal. A first terminal of a switch 60 is connected to the second terminal of switch 53 at a node 56. A second terminal of switch 60 provides a positive doubled output voltage, $2V_{DD}$, at a node 61. A switch 64 has a first terminal connected to node 58 and a second terminal connected to power supply voltage VDD. A first electrode of a reservoir capacitor 66 is connected to the second terminal of switch 60 at node 61, and a second electrode of capacitor 66 is connected to the power supply voltage for receiving $V_{DD}$.

Negative voltage portion 52 comprises a switch 70 having a first terminal connected to node 56 and a second terminal connected to a node 71. A first terminal of a switch 72 is connected to the second terminal of switch 70. A second terminal of switch 72 is connected to the ground reference terminal. A first electrode of a reservoir capacitor 74 is connected to the second terminal of switch 72. A first electrode of a transfer capacitor 78 is connected to node 71, and a second electrode of transfer capacitor 78 is connected at a node 79 to a first terminal of a switch 80 and to a first terminal of a switch 82. A second terminal of switch 82 is connected to a ground reference terminal. A second terminal of switch 80 is connected to a second electrode of capacitor 74 at a node 86 which provides a negative doubled output voltage, $(-2V_{DD})$. Each of switches 53, 57, 60, 64, 70, 72, 80 and 82 has a control electrode. The control electrode of switches 53, 57, 72 and 80 is coupled to a control signal $\phi_1$, and the control electrode of switches 60, 64, 70 and 82 is coupled to a control signal $\phi_2$. Control signals $\phi_1$ and $\phi_2$ are nonoverlapping clock signals.

In operation, charge pump 50 has first and second periods of operation as defined by the logic states of control signals $\phi_1$ and $\phi_2$. During a first period of circuit operation, control signal $\phi_1$ has a high logic state and control signal $\phi_2$ has a low logic state. During the first period of circuit operation, switches 53, 57, 72 and 80 are conductive and switches 60, 64, 70 and 82 are nonconductive. During a second period of circuit operation, control signal $\phi_1$ has a low logic state and control signal $\phi_2$ has a high logic state. During the second period of circuit operation, switches 53, 57, 72 and 80 are nonconductive, and switches 60, 64, 70 and 82 are conductive.

In the positive voltage portion 51 during the first period of circuit operation, capacitor 55 charges to a voltage equal to the supply voltage $V_{DD}$ via switches 53 and 57. During the second period of circuit operation, trnasfer capacitor 55 is disconnected from between ground and $V_{DD}$. The second electrode of transfer capacitor 55 is negatively charged and is connected to supply voltage $V_{DD}$ by switch 64. As a result, the first electrode of transfer capacitor 55 which is positively charged is translated to a doubled transfer voltage of $(+2V_{DD})$. The doubled transfer voltage across transfer capacitor 55 is charge shared onto reservoir capacitor 66 via switches 60 and 64. Reservoir capacitor 66 is permanently connected between power supply voltage $V_{DD}$ and the positive doubled output voltage, $(+2V_{DD})$ at node 61. The charge on reservoir capacitor 66 is added with the power supply voltage $V_{DD}$ to provide a continuous positive output voltage equal to $(+2V_{DD})$ at node 61.

In the negative voltage portion 52, during the second period of circuit operation the transfer voltage, $(+2V_{DD})$ at node 56 is charge shared onto transfer capacitor 78 via switches 64, 70 and 82. Subsequent to the second period of circuit operation, transfer capacitor 78 is disconnected from the $(+2VDD)$ transfer voltage. The first electrode of transfer capacitor 78 at node 71 is positively charged with respect to ground and is connected to ground during a successive first period of circuit operation. The voltage across transfer capacitor 78 is translated and the negatively charged second electrode of transfer capacitor 78 is at a voltage potential of $(-2V_{DD})$. The $(-2V_{DD})$ voltage of transfer capacitor 78 is charge shared onto reservoir capacitor 74 via switches 72 and 80. Reservoir capacitor 74 is always connected between the ground reference and node 86 to provide a continuous negative output voltage of $(-2V_{DD})$.

In the illustrated form, the $(+2V_{DD})$ transfer voltage at node 56 functions to concurrently charge both reservoir capacitor 66 of the positive voltage portion 51 and transfer capacitor 78 of the negative voltage portion 52. Charge pump 50 avoids having a circuit current path thru switch 60 and reservoir capacitor 66 in order to couple charge to the negative circuit portion 52, thereby reducing power loss and increasing voltage efficiency.

In another form, charge pump 50 may be expanded to include other voltage doubling circuit portions for further doubling the power supply voltage from $2V_{DD}$ to additional integer multiples of $V_{DD}$. If such a circuit extension is desired, duplicates of charge pump circuit 50 may be provided with the $2V_{DD}$ transfer voltage of charge pump 50 utilized as the power supply voltage for the additional circuitry.

Figure 3:
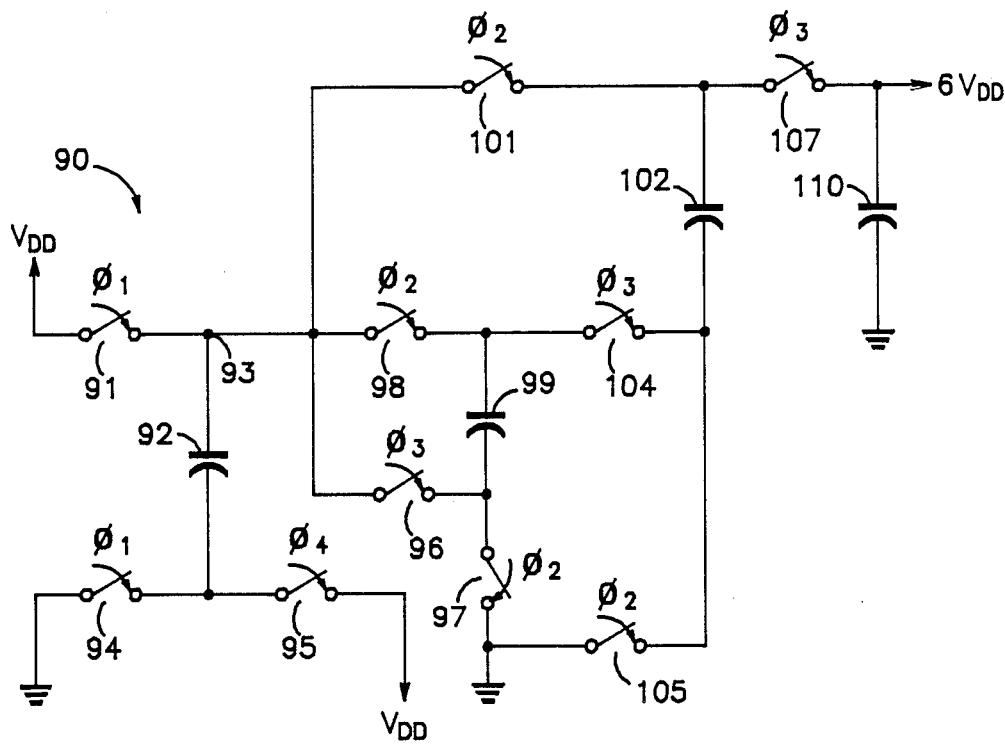
FIG. 3 illustrates in schematic form another form of the charge pump circuit of the present invention.

Shown in FIG. 3 is a charge pump circuit 90 which represents an expansion of charge pump 50 to provide an output voltage which is six times the magnitude of the power supply voltage. For purposes of illustration, only a positive output voltage is illustrated in FIG. 3 to illustrate an extension of charge pump 50. However, a negative voltage portion similar to portion 52 of charge pump 50 can be readily added to charge pump 90 to also provide a negative output voltage. A switch 91 has a first terminal connected to a power supply $V_{DD}$. A second terminal of switch 91 is connected to a first electrode of a transfer capacitor 92 at a node 93. A second electrode of capacitor 92 is connected to a first terminal of a switch 94. A second terminal of switch 94 is connected to a ground reference terminal. The second electrode of capacitor 92 is also connected to a first terminal of a switch 95. A second terminal of switch 95 is connected to power supply voltage $V_{DD}$. A first terminal of a switch 96 is connected to node 93. A second terminal of switch 96 is connected to a first terminal of a switch 97. A second terminal of switch 97 is connected to the ground reference terminal. A first terminal of a switch 98 is connected to node 93. A second terminal of switch 98 is connected to a first electrode of a transfer capacitor 99. A second electrode of transfer capacitor 99 is connected to the first terminal of switch 97. A first terminal of a switch 101 is connected to node 93, and a second terminal of switch 101 is connected to a first electrode on a transfer capacitor 102. A second electrode of capacitor 102 is connected to a first terminal of both a switch 104 and a switch 105. A second terminal of switch 104 is connected to the first electrode of capacitor 99. A second terminal of switch 105 is connected to the ground reference terminal. A first terminal of a switch 107 is connected to the first electrode of transfer capacitor 102. A second terminal of switch 107 provides an output voltage having a value of 6VDD and is connected to a first electrode of a reservoir capacitor 110. A second electrode of reservoir capacitor 110 is connected to the ground referece terminal. Each of switches 91, 94, 95, 96, 97, 98, 101, 104, 105 and 107 has a control electrode which is connected to one of control signals $\phi 1$, $\phi 2$, $\phi 3$ or $\phi 4$. Control signal $\phi 1$ is connected to the control electrode of each of switches 91 and 94. Control signal $\phi 2$ is connected to the control electrode of each of switches 97, 98, 101 and 105. Control signal $\phi 3$ is connected to the control electrode of each of switches 96, 104 and 107. Control signal $\phi 4$ is connected to the control electrode of switch 95.

Figure 4:
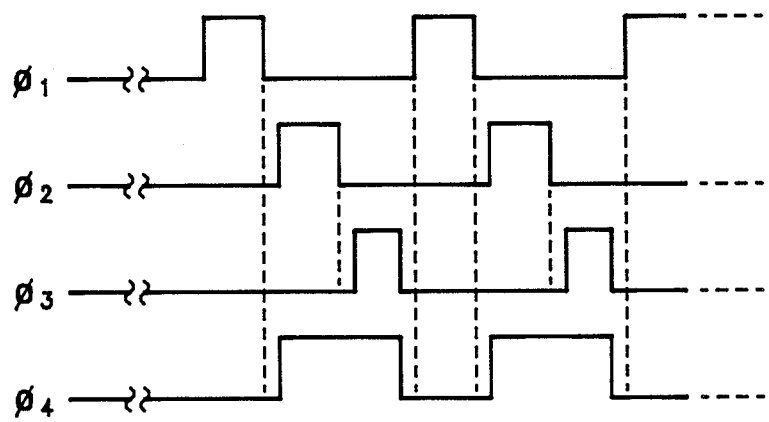
FIG. 4 illustrates in graphical form control signals associated with the circuit of FIG. 3.

In operation, charge pump 90 operates repetitively in three time periods. In a first time period as determined by the time when control signal $\phi 1$ of FIG. 4 is at a logic high level, transfer capacitor 92 charges to the $V_{DD}$ supply voltage. Control signals $\phi 2$, $\phi 3$ and $\phi 4$ are at a logic low level. Therefore, switches 91 and 94 are conductive and all other switches are nonconductive. In the second time period, control signal $\phi 2$ and $\phi 4$ are at a logic high level. Switches 95, 97, 98, 101 and 105 are conductive and all other switches are nonconductive. Transfer capacitor 92 is reconfigured and connected in series with supply voltage $V_{DD}$. Simultaneously, each of transfer capacitors 99 and 102 is coupled between the first electrode of transfer capacitor 92 and the ground reference terminal which charge shares capacitor 92 with capacitors 99 and 102. A voltage of $(+2V_{DD})$ is charged onto each of transfer capacitors 99 and 102. In the third time period, control signals $\phi 3$ and $\phi 4$ are at a logic level making only switches 95, 96, 104 and 107 conductive. Transfer capacitors 92, 99 and 102 are reconfigured in series between the first terminal of switch 107 and the first terminal of switch 95 which is at a potential of $V_{DD}$. Therefore, a sum of the voltage $V_{DD}$ and the voltage on transfer capacitors 92, 99 and 102 is coupled to reservoir capacitor 110 via switch 107. During the third time period, reservoir capacitor 110 charges to a voltage potential of $(+6V_{DD})$. After a sufficient charging time period, clock signals $\phi 3$ and $\phi 4$ transition back to a logic low level and the above described circuit operation becomes repetitive. Again, a predetermined integer multiple of the power supply voltage is provided by only using one reservoir capacitor and a plurality of transfer capacitors.

By now it should be apparent that charge pump 50 provides a positive and negative output voltage which is double in magnitude a power supply voltage powering the circuit and charge pump 90 provides a positive output voltage which is six times the magnitude of the power supply voltage. The charge pump disclosed herein operates in a very power efficient manner by using only a single reservoir capacitor per each output voltage provided. By eliminating a reservoir capacitor and a switch from a current path previously utilized to provide a negative doubled output voltage, charge pump 50 minimizes power loss which results in a more accurate doubled output voltage. In other words, charge pump 50 does not require the positive doubled output voltage portion to provide current thru switch 60 for the negative doubled output voltage portion. Because switch 60 may have significant switching resistance, elimination of current flow thru switch 60 to provide current to negative voltage portion 12 minimizes a potential decrease in value of the output voltage due to switch resistance. Therefore, the power supply source resistance in negative circuit portion 52 is minimized to provide a very accurate inverted doubled output voltage.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

We claim:

1. A voltage doubling and inverting charge pump circuit, comprising:
    a first switch having a first terminal coupled to a power supply terminal for receiving a power supply voltage, a second terminal, and a control terminal for receiving a first control signal;
    a first capacitor having a first electrode coupled to the second terminal of the first switch, and having a second electrode;
    a second switch having a first terminal coupled to the second electrode of the first capacitor, having a second terminal coupled to a reference voltage terminal, and having a control terminal for receiving the first control signal;
    a third switch having a first terminal coupled to the first electrode of the first capacitor, a second terminal coupled to a first output terminal which provides an output voltage of a first polarity and substantially twice the power supply voltage, and a control terminal for receiving a second control signal;
    a second capacitor having a first electrode coupled to the first output terminal, and having a second electrode coupled to the power supply terminal;
    a fourth switch having a first terminal coupled to the power supply terminal, a second terminal coupled to the second electrode of the first capacitor, and a control terminal for receiving the second control terminal;
    a fifth switch having a first terminal coupled to the first electrode of the first capacitor, a second terminal, and a control terminal for receiving the second control signal;
    a third capacitor having a first electrode coupled to the second terminal of the fifth switch, and having a second electrode;
    a sixth switch having a first terminal coupled to the second electrode of the third capacitor, a second terminal coupled to the reference voltage terminal, and a control terminal for receiving the second control signal;
    a seventh switch having a first terminal coupled to the first electrode of the third capacitor, a second terminal coupled to the reference voltage terminal, and a control terminal for receiving the first control signal;
    a fourth capacitor having a first electrode coupled to the second terminal of the seventh switch, and having a second electrode coupled to a second output terminal which provides an output voltage of a second polarity substantially twice the power supply voltage; and
    an eighth switch having a first terminal coupled to the second output terminal, a second terminal coupled to the second electrode of the third capacitor, and a control terminal coupled to the first control signal.

2. The voltage doubling and inverting charge pump circuit of claim 1 wherein said first and second control signals are nonoverlapping clock signals.

3. The voltage doubling and inverting charge pump circuit of claim 1 wherein said first polarity is a positive polarity relative to a reference voltage coupled to the reference voltage terminal and said second polarity is a negative polarity relative to the reference voltage.

4. A method for providing a positive and a negative output voltage for a circuit, each output voltage having a magnitude substantially twice a magnitude of a power supply voltage for powering the circuit, comprising the steps of:
    charging a first capacitor of the circuit to the power supply voltage by coupling a first electrode of the first capacitor to the power supply voltage and a second electrode of the first capacitor to a reference voltage terminal;
    charging a second capacitor to the power supply voltage;
    coupling the second electrode of the first capacitor to the power supply voltage;
    coupling a third capacitor between the first electrode of the first capacitor and the reference voltage terminal to charge the third capacitor to substantially twice the power supply voltage;
    outputting a first output voltage equal to a sum of voltage stored by the second capacitor and the power supply voltage;
    coupling a fourth capacitor in parallel with the third capacitor to charge share charge from the third capacitor onto the fourth capacitor; and
    outputting a second output voltage equal to voltage stored by the fourth capacitor.

5. In a voltage multiplying circuit, a method for providing an output voltage which is a predetermined integer mulitple of a magnitude of a power supply voltage which powers the circuit, comprising the steps of:
    providing a first voltage transfer capacitor and charging the first voltage transfer capacitor to the power supply voltage;
    selectively coupling a predetermined plurality of additional voltage transfer capacitors to the first voltage transfer capacitor and charging each additional voltage transfer capacitor to a voltage which is substantially twice the power supply voltage;
    providing a single reservoir capacitor between a reference voltage terminal and an output terminal; and
    selectively coupling each of the voltage transfer capacitors to the single reservoir capacitor at the output terminal to charge the reservoir capacitor to the predetermined integer multiple of the power supply voltage.

* * * * *